United States Patent
Jung et al.

(10) Patent No.: US 11,799,696 B2
(45) Date of Patent: Oct. 24, 2023

(54) TRANSCEIVER AND DRIVING METHOD THEREOF

(71) Applicant: Samsung Display Co., Ltd., Yongin-Si (KR)

(72) Inventors: Young Suk Jung, Yongin-si (KR); Weon Jun Choe, Yongin-si (KR); Heen Dol Kim, Yongin-si (KR); Chae Hee Park, Yongin-si (KR); Ji Ye Lee, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 17/866,726

(22) Filed: Jul. 18, 2022

(65) Prior Publication Data
US 2023/0188386 A1 Jun. 15, 2023

(30) Foreign Application Priority Data
Dec. 15, 2021 (KR) .................. 10-2021-0180127

(51) Int. Cl.
*H04L 25/02* (2006.01)
*H04L 25/03* (2006.01)
*H04B 1/38* (2015.01)

(52) U.S. Cl.
CPC ............ *H04L 25/0272* (2013.01); *H04B 1/38* (2013.01); *H04L 25/03* (2013.01)

(58) Field of Classification Search
CPC ......... H04B 1/38; H04B 1/40; H04L 25/0264; H04L 25/0272; H04L 25/0286; H04L 25/03

USPC ....... 375/219, 220, 222, 253, 254, 257, 260, 375/265, 267, 299, 324, 330, 347, 349; 455/101–103
See application file for complete search history.

(56) References Cited

U.S. PATENT DOCUMENTS

| | | | | |
|---|---|---|---|---|
| 7,535,957 | B2* | 5/2009 | Ozawa | H03L 7/113 348/530 |
| 8,963,944 | B2* | 2/2015 | Lu | H04N 19/152 375/240 |
| 9,729,681 | B2 | 8/2017 | Lee | |
| 2009/0103646 | A1* | 4/2009 | Dowling | H04L 1/0059 375/265 |
| 2013/0170579 | A1* | 7/2013 | Nishioka | H04L 1/0083 375/295 |
| 2016/0234504 | A1* | 8/2016 | Good | H04N 19/146 |
| 2022/0094575 | A1* | 3/2022 | Tung | H04J 13/0011 |

* cited by examiner

*Primary Examiner* — Young T. Tse
(74) *Attorney, Agent, or Firm* — Innovation Counsel LLP (57) ABSTRACT

A transceiver of the present inventive concept includes a transmitter and a receiver connected by a first line and a second line, and the transmitter includes a first encoder; a second encoder; and a transmission driver. The first encoder generates a first encoded data different from a first data during a first period and the second encoder generates a second encoded data equal to a second data during the first period, the second encoder generates the second encoded data different from the second data during a second period and the first encoder generates the first encoded data equal to the first data during the second period, and the first period and the second period are arranged to alternate with each other.

20 Claims, 9 Drawing Sheets

TRANSCEIVER AND DRIVING METHOD THEREOF

CROSS-REFERENCE TO RELATED APPLICATION

The application claims priority to and the benefit of Korean Patent Application No. 10-2021-0180127, filed Dec. 15, 2021, which is hereby incorporated by reference for all purposes as if fully set forth herein.

BACKGROUND

1. Field

The present inventive concept relates to a transceiver and a driving method thereof.

2. Discussion

As information technology develops, interest in data transmission technology between a plurality of devices is increasing. For modulation among data transmission technologies, technologies such as Pulse Amplitude Modulation 4 (PAM4) and Non Return to Zero (NRZ) are widely used.

Compared to NRZ, PAM4 can transmit data twice as much, so PAM4 is widely used for high-resolution and high-frequency data transmission. In order to generate a clock signal in a receiver using transmitted data, frequent data transitions are required. For these transitions, encoding at a transmitting end and decoding at a receiving end are required. In this case, it is necessary to generate overhead packets independent of actual data. As such overhead packets increase, there is a problem in that the actual data transmission rate decreases.

SUMMARY

A technical problem to be solved is to provide a transceiver capable of minimizing overhead packets while maintaining frequent transitions of transmitted data and a driving method thereof.

A transceiver according to an embodiment of the present inventive concept may include a transmitter and a receiver connected by a first line and a second line, and the transmitter may include a first encoder generating first encoded data by using first data; a second encoder generating second encoded data by using second data; and a transmission driver generating a first voltage signal and a second voltage signal corresponding to a combination of the first encoded data and the second encoded data, applying the first voltage signal and the second voltage signal to the receiver through the first line and the second line, respectively. The first encoder may generate the first encoded data different from the first data during a first period and the second encoder generates the second encoded data equal to the second data during the first period, the second encoder may generate the second encoded data different from the second data during a second period and the first encoder generates the first encoded data equal to the first data during the second period, and the first period and the second period may be arranged to alternate with each other.

An interval between an end time point of the first period and a start time point of the second period may be greater than an interval between an end time point of the second period and a start time point of a first period following the second period.

The interval between the end time point of the first period and the start time point of the second period may be equal to a transmission time of one unit packet.

The number of unit packets constituting the first period may be $(2^{(n-1)})-1$ when the number of bits constituting the unit packet is n, where n is a positive integer greater than or equal to 2.

A length of the first period and a length of the second period may be the same.

The first encoder may generate a first catalyst packet different from first data packets of the first data, encode the first data packets into first conversion packets using the first catalyst packet, and output the first catalyst packet and the first conversion packets as the first encoded data during the first period.

The first encoder may generate the first conversion packets by performing an XOR (Exclusive OR) operation on the first catalyst packet and the first data packets.

The second encoder may generate a second catalyst packet different from second data packets of the second data, encode the second data packets into second conversion packets using the second catalyst packet, and output the second conversion packets as the second encoded data during the second period.

The second encoder may output the second catalyst packet between the end time point of the first period and the start time point of the second period.

The receiver may include an analog front end receiving the first voltage signal and the second voltage signal and generating first received data and second received data corresponding to a combination of the first voltage signal and the second voltage signal; a first decoder generating first decoded data by using the first received data; and a second decoder generating second decoded data by using the second received data.

The first received data may include the same packets as the first encoded data, the second received data may include the same packets as the second encoded data, the first decoded data may include the same packets as the first data, and the second decoded data may include the same packets as the second data.

The first decoder may decode the first conversion packets into the first data packets by using the first catalyst packet among the first received data, and the second decoder may decode the second conversion packets into the second data packets by using the second catalyst packet among the second received data.

The first decoder may generate the first data packets by performing an XOR operation on the first catalyst packet and the first conversion packets, and the second decoder may generate the second data packets by performing an XOR operation on the second catalyst packet and the second conversion packets.

According to an embodiment of the present inventive concept, a driving method of a transceiver including a transmitter and a receiver connected by a first line and a second line may include generating, by a first encoder of the transmitter, first encoded data using first data; generating, by a second encoder of the transmitter, second encoded data using second data; and generating, by a transmission driver of the transmitter, a first voltage signal and a second voltage signal corresponding to a combination of the first encoded data and the second encoded data, applying the first voltage signal and the second voltage signal to the receiver through the first line and the second line, respectively. The first encoder may generate the second encoded data different from the second data during a second period and the first encoder generates the first encoded data equal to the first data during the second period, the second encoder may generate the second encoded data different from the second data during a second period and the first encoder generates the first encoded data equal to the first data during the second period, and the first period and the second period may be arranged to alternate with each other.

An interval between an end time point of the first period and a start time point of the second period may be greater than an interval between an end time point of the second period and a start time point of a first period following the second period32.

The interval between the end time point of the first period and the start time point of the second period may be equal to a transmission time of one unit packet.

The number of unit packets constituting the first period may be $(2^{(n-1)})-1$ when the number of bits constituting the unit packet is n, where n is a positive integer greater than or equal to 2.

A length of the first period and a length of the second period may be the same.

The first encoder may generate a first catalyst packet different from first data packets of the first data, encode the first data packets into first conversion packets using the first catalyst packet, and output the first catalyst packet and the first conversion packets as the first encoded data during the first period.

The first encoder may generate the first conversion packets by performing an XOR operation on the first catalyst packet and the first data packets.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Hereinafter, various embodiments of the present inventive concept will be described in detail with reference to the accompanying drawings so that those of ordinary skill in the art may easily implement the present inventive concept. The present inventive concept may be embodied in various different forms and is not limited to the embodiments described herein.

In order to clearly describe the present inventive concept, parts that are not related to the description are omitted, and the same or similar components are denoted by the same reference numerals throughout the specification. Therefore, the reference numerals described above may also be used in other drawings.

In addition, the size and thickness of each component shown in the drawings are arbitrarily shown for convenience of description, and thus the present inventive concept is not necessarily limited to those shown in the drawings. In the drawings, thicknesses may be exaggerated to clearly express the layers and regions.

In addition, in the description, the expression "is the same" may mean "substantially the same". That is, it may be the same enough to convince those of ordinary skill in the art to be the same. In other expressions, "substantially" may be omitted.

Figure 1:
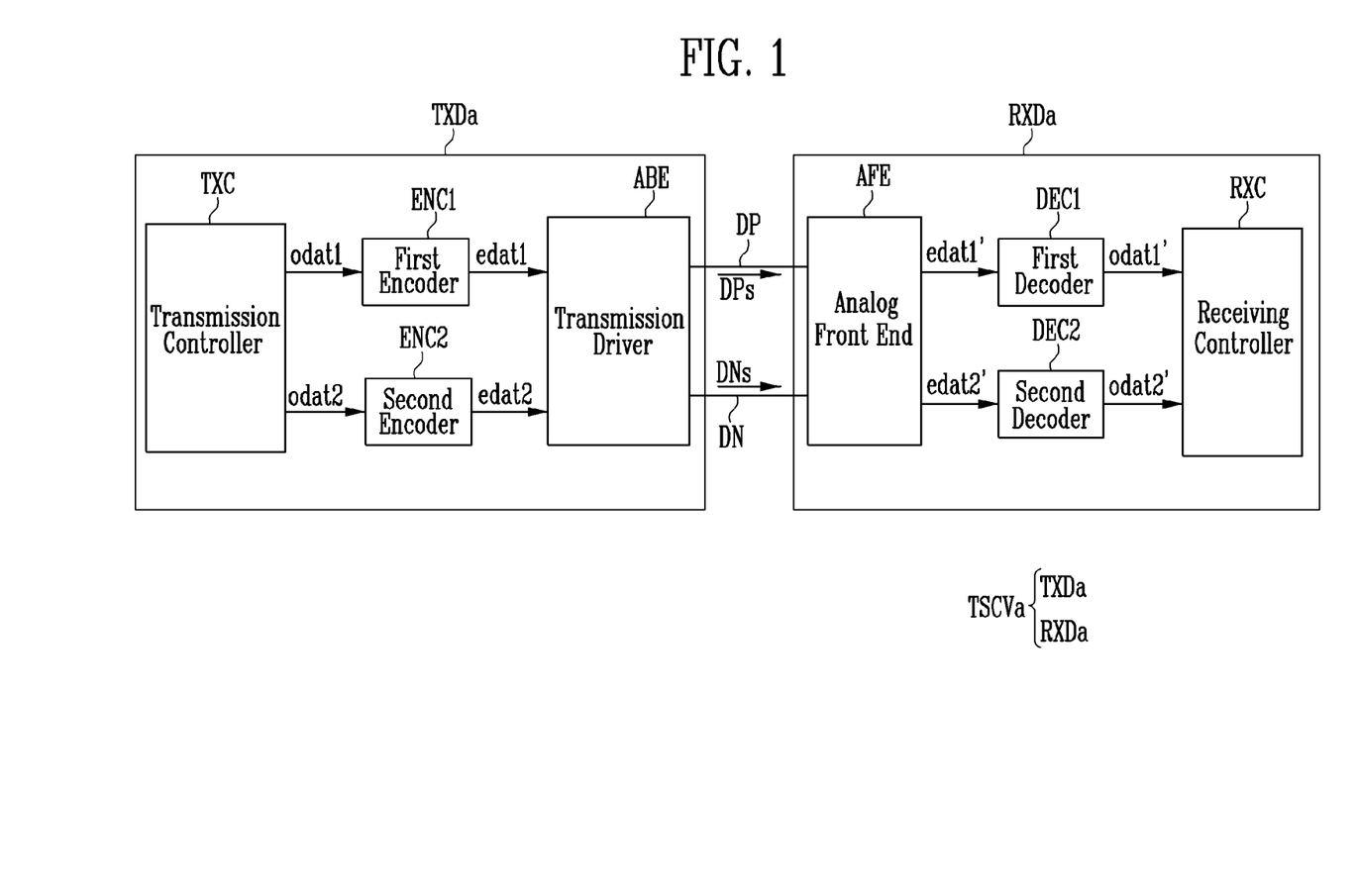
FIG. 1 is a diagram for explaining a transceiver according to an embodiment of the present inventive concept.
Figure 2:
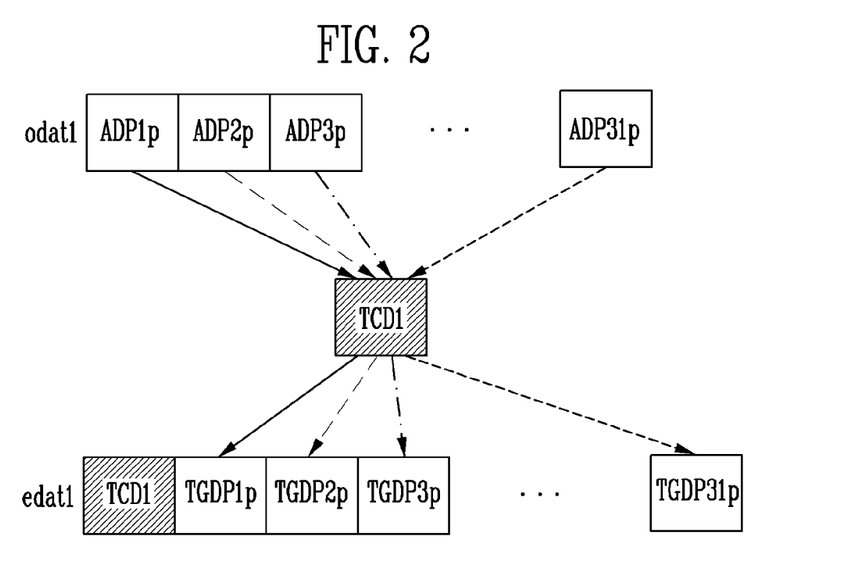
FIG. 2 is a diagram for explaining a first encoder according to an embodiment of the present inventive concept.
Figure 3:
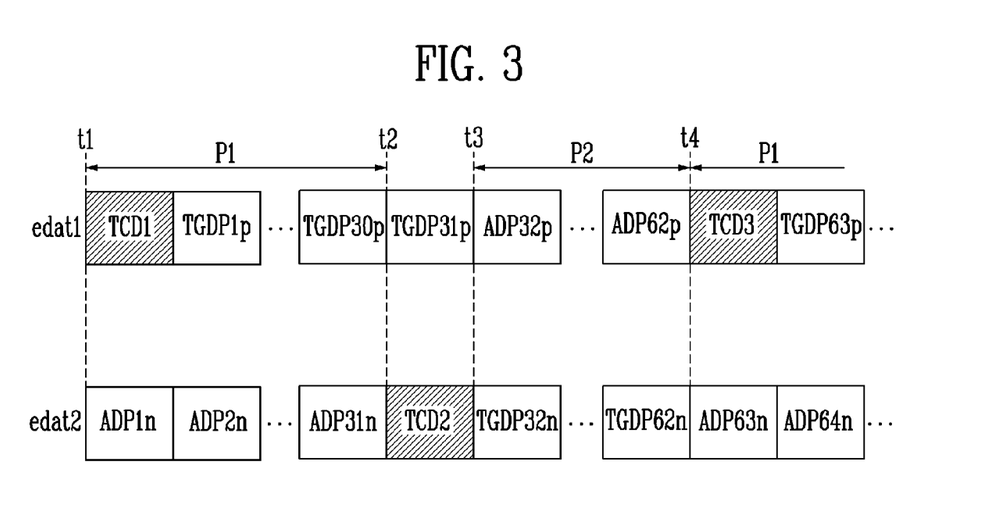
FIG. 3 is a diagram for explaining first encoded data and second encoded data according to an embodiment of the present inventive concept.
Figure 4:
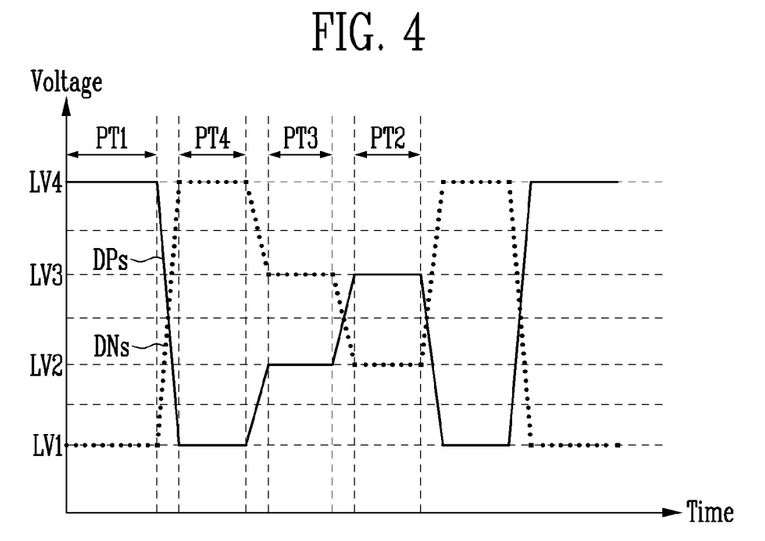
FIGS. 4 and 5 are diagrams for explaining a transmission driver and an analog front end according to an embodiment of the present inventive concept.
Figure 5:
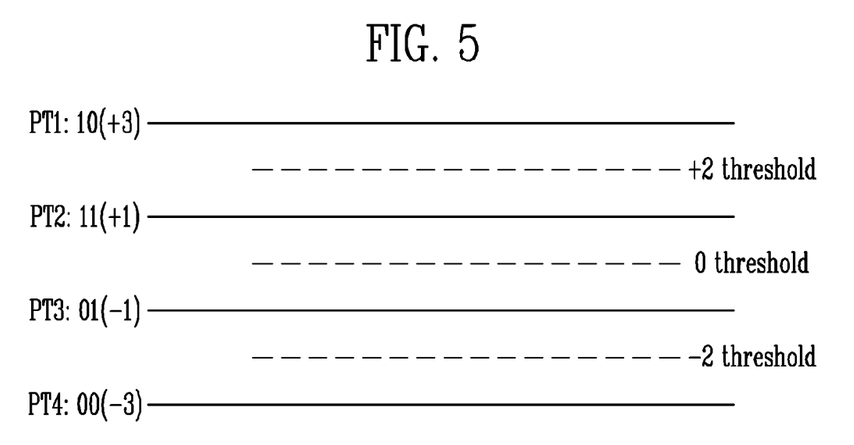
Figure 6:
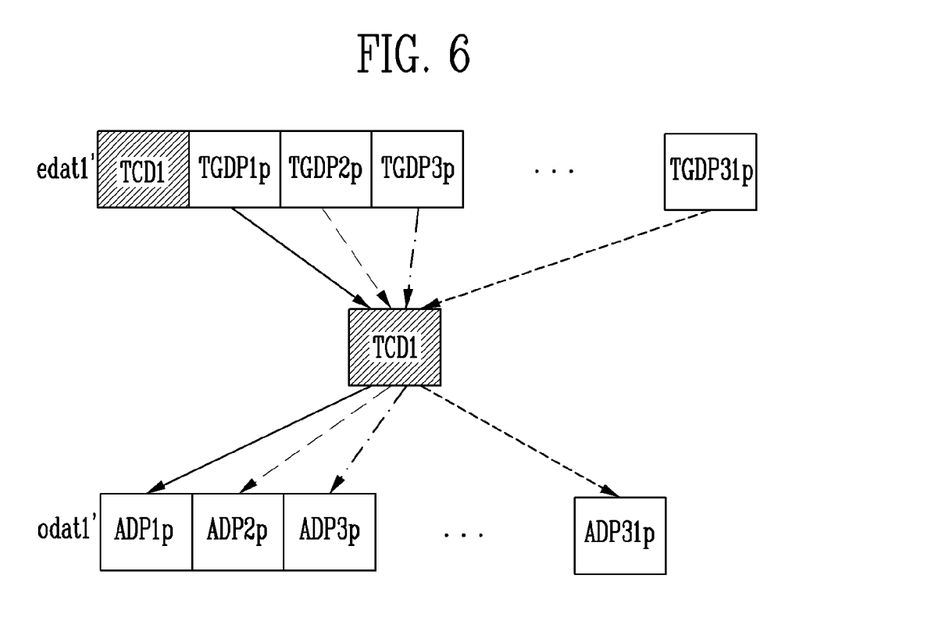
FIG. 6 is a diagram for explaining a first decoder according to an embodiment of the present inventive concept.

FIG. 1 is a diagram for explaining a transceiver according to an embodiment of the present inventive concept. FIG. 2 is a diagram for explaining a first encoder according to an embodiment of the present inventive concept. FIG. 3 is a diagram for explaining first encoded data and second encoded data according to an embodiment of the present inventive concept. FIGS. 4 and 5 are diagrams for explaining a transmission driver and an analog front end according to an embodiment of the present inventive concept. FIG. 6 is a diagram for explaining a first decoder according to an embodiment of the present inventive concept.

Referring to FIG. 1, a transceiver TSCVa according to an embodiment of the present inventive concept may include a transmitter TXDa and a receiver RXDa.

The transmitter TXDa may include a transmission controller TXC, a first encoder ENC1, a second encoder ENC2, and a transmission driver ABE.

The transmission controller TXC may provide first data odat1 to the first encoder ENC1 and provide second data odat2 to the second encoder ENC2. The transmission controller TXC may be a dedicated controller provided for the transmitter TXDa only, or may be a part of a general-purpose controller provided in an apparatus in which the transmitter TXDa is used.

The transmission controller TXC may provide the first data odat1 and the second data odat2 in parallel at the same speed to the first encoder ENC1 and the second encoder ENC2, respectively. That is, the first data odat1 and the second data odata2 may have the same unit interval (UI) and may be provided at the same time. For example, the transmission controller TXC may provide odd-numbered bits as the first data odat1 and provide even-numbered bits as the second data odat2. For example, when the transmission controller TXC transmits data of "10101101", the transmission controller TXC may sequentially provide "1110" as the first data odat1 and sequentially provide "0011" as the second data odat2 to the first encoder ENC1 and the second encoder ENC2, respectively.

The first encoder ENC1 may generate first encoded data edat1 by using the first data odat1. Some of the first encoded data edat1 may be the same as the first data odat1 and the rest of the first encoded data edat1 may be different from the first data odat1.

Referring to FIG. 2, a case in which the first encoded data edat1 is different from the first data odat1 will be described.

The first data odat1 may include first data packets ADP1$p$, ADP2$p$, ADP3$p$, . . . , and ADP31$p$. The first encoder ENC1 may generate a first catalyst packet TCD1 different from the received first data packets ADP1$p$ to ADP31$p$. The number of bits of the first catalyst packet TCD1 and the number of bits of each of the first data packets ADP1$p$ to ADP31$p$ may be set to be the same. For example, when the number of bits of the first catalyst packet TCD1 is set to 6 bits, each of the first data packets ADP1$p$ to ADP31$p$ may be set to 6 bits. Meanwhile, a first bit of the first catalyst packet TCD1, that is the Most Significant Bit (MSB), may be a transition bit set to have a logic level different from that of a previous bit of the first catalyst packet TCD1 in the first encoded data. For example, if the previous bit of the first catalyst packet TCD1 in the first encoded data edat1 is 0, the MSB of the first catalyst packet TCD1 may be set to 1. Meanwhile, if the previous bit of the first catalyst packet TCD1 in the first encoded data edat1 is 1, the MSB of the first catalyst packet TCD1 may be set to 0.

Bits other than the MSB of the first catalyst packet TCD1 (for example, five Least Significant Bits (LSB)) may be set differently from the first data packets ADP1$p$ to ADP31$p$. For example, if the MSB (for example, a first bit of a first data packet) is 0, the LSB of the first data packets ADP1$p$ to ADP31$p$ and the LSB of the first catalyst packet TCD1 may be set so that bits other than the MSB of the first data packet (for example, five LSBs) and the LSB of the first catalyst packet TCD1 are different from each other. On the other hand, if the MSB of the first data packet is 1, the first data packet ADP1$p$ to ADP31$p$ and the LSB of the first catalyst packet TCD1 may be set so that the LSB of the complement of the first data packet ADP1$p$ to ADP31$p$ and the LSB of the first catalyst packet TCD1 are different from each other. The complement of the first data packet ADP1$p$ to ADP31$p$ may mean a packet in which bits of the first data packet are inverted. For example, if the first data packet is "110110", the complement of the first data packet may be "001001".

The first encoder ENC1 may encode the first data packets ADP1$p$ to ADP31$p$ into first conversion packets TGDP1$p$, TGDP2$p$, TGDP3$p$, . . . , and TGDP31$p$ using the first catalyst packet TCD1. For example, the first encoder ENC1 may generate the first conversion packets TGDP1$p$ to TGDP31$p$ by performing an XOR (Exclusive OR) operation on the first catalyst packet TCD1 and the first data packets ADP1$p$ to ADP31$p$. For example, the first encoder ENC1 may generate a first conversion packet TGDP1$p$ by performing an XOR operation on corresponding bits of a first data packet ADP1$p$ and the first catalyst packet TCD1. The first encoder ENC1 may include an XOR gate which receives the first data packet ADP1$p$ and the first catalyst packet TCD1 as inputs. For example, if the first data packet ADP1$p$ is "010111" and the first catalyst packet TCD1 is "001101", the first conversion packet TGDP1$p$ may be set to "011010". Since these first conversion packets TGDP1$p$ to TGDP31$p$ can guarantee frequent transitions, it can be effective for a clock recovery operation of the receiver RXDa.

Referring to FIG. 3, the first encoder ENC1 may sequentially output the generated first catalyst packet TCD1 and first conversion packets TGDP1$p$ to TGDP31$p$. For example, the first encoder ENC1 may output the first catalyst packet TCD1 and the first conversion packets TGDP1$p$ to TGDP30$p$ as the first encoded data edat1 during a first period P1. That is, the first encoder ENC1 may generate the first encoded data edat1 different from the first data odat1 during the first period P1.

The second encoder ENC2 may generate second encoded data edat2 using the second data odat2. During the first period P1, the second encoder ENC2 may generate the second encoded data edat2 equal to the second data odat2. That is, during the first period P1, when the second data odat2 includes second data packets ADP1$n$, ADP2$n$, . . . , and ADP31$n$, the second encoded data edat2 may include the second data packets ADP1$n$, ADP2$n$, . . . , and ADP31$n$ which is the same as the second data packets ADP1$n$, ADP2$n$, . . . , and ADP31$n$.

During a period between an end time point t2 of the first period P1 and a start time point of a second period P2, the first encoder ENC1 may output the last first conversion packet TGDP31$p$ based on the first catalyst packet TCD1 and the second encoder ENC2 may output a second catalyst packet TCD2. That is, the second encoder ENC2 may output the second catalyst packet TCD2 between the end time point t2 of the first period P1 and the start time point t3 of a second period P2. The second encoder ENC2 may generate the second catalyst packet TCD2 different from the second data packets ADP1$n$, ADP2$n$, . . . , and ADP31$n$ of the second data odat2. Since a process of generating the second catalyst packet TCD2 in the second encoder ENC2 may be the same as a process of generating the first catalyst packet TCD1 in the first encoder ENC1, duplicate descriptions thereof will be omitted.

During the second period P2, the first encoder ENC1 may generate the first encoded data edat1 equal to the first data odat1. That is, during the second period P2, when the first data odat1 includes first data packets ADP32$p$, . . . , and ADP62$p$, the first encoded data edat1 may include the same first data packets ADP32$p$, . . . , and ADP62$p$.

During the second period P2, the second encoder ENC2 may generate the second encoded data edat2 different from the second data odat2 ADP32$n$, . . . , and ADP62$n$. The second encoder ENC2 may encode the second data packets into second conversion packets TGDP32$n$, . . . , and TGDP62$n$ using the second catalyst packet TCD2, and may output the second conversion packets TGDP32$n$ to TGDP62$n$ as the second encoded data edat2 during the second period P2. Since a process in which the second encoder ENC2 generates the second conversion packets TGDP32$n$ to TGDP62$n$ may be the same as a process in which the first encoder ENC1 generates the first conversion packets TGDP1$p$ to TGDP31$p$, duplicate descriptions thereof will be omitted.

In the present embodiment, the first period P1 and the second period P2 may be arranged to alternate with each other. For example, the second period P2 may start at the time point t3 after the time point t2 at which the first period P1 ends, and the first period P1 may start at a time point t4 at which the second period P2 ends. Since the first period P1 starting at the time point t4 may proceed in the same manner as the first period P1 starting at the time point t1, duplicate descriptions thereof will be omitted.

According to the present embodiment, the first encoder ENC1 and the second encoder ENC2 may not simultaneously generate catalyst packets but generate catalyst packet at different time periods. That is, in the present embodiment, when the first encoder ENC1 generates the first catalyst packet TCD1, the second encoder ENC2 may not generate a catalyst packet. Also, when the second encoder ENC2 generates the second catalyst packet TCD2, the first encoder ENC1 may not generate a catalyst packet. The catalyst packet may be overhead packets. In the present embodiment, the actual data transmission rate can be increased by minimizing the generation of catalyst packets. Also, since there are always conversion packets to guarantee frequent data transitions at every time point, there is no problem in the operation of generating a clock signal in the receiver RXDa.

Referring to FIG. 3, an interval between the end time point t2 of the first period P1 and the start time point t3 of the second period P2 may be greater than an interval between an end time point t4 of the second period P2 and a start time point t4 of the first period P1. As described above, this may be because the second catalyst packet TCD2 is provided as the second encoded data edat2 and the last first conversion packet TGDP31p is provided as the first encoded data edat1 at the time point t2. That is, the interval between the end time point t2 of the first period P1 and the start time point t3 of the second period P2 may be equal to the transmission time of one unit packet. On the other hand, the interval between the end time point t4 of the second period P2 and the start time point t4 of the first period P1 may be zero. That is, the end time point t4 of the second period P2 and the start time point t4 of the first period P1 may coincide with each other.

When the number of bits constituting the first catalyst packet TCD1 is n, the number of unit packets constituting the first period P1 may be $(2^{(n-1)})-1$. For example, when the number of bits constituting the first catalyst packet TCD1 is 6, the number of unit packets constituting the first period P1 may be 31. As described above, since 5 LSBs of the first catalyst packet TCD1 include the number of 32 cases, this is to ensure that the LSB of the first catalyst packet TCD1 and the LSB of 31 first data packets ADP1p to ADP31p (or their complements) are different from each other. Meanwhile, when the number of bits constituting the unit packet is n, the number of unit packets constituting the first period P1 may be $(2^{(n-1)})-1$.

A length of the first period P1 and a length of the second period P2 may be the same. In an embodiment of FIG. 3, each of the first period P1 and the second period P2 may include 31 unit packets.

The transmission driver ABE may generate a first voltage signal DPs and a second voltage signal DNs corresponding to a combination of the first encoded data edat1 and the second encoded data edat2, apply the first voltage signal DPs and the second voltage signal DNs to the analog front end AFE through a first line and a second line DN, respectively. For example, the transmission driver ABE may generate the first voltage signal DPs and the second voltage signal DNs using a Pulse Amplitude Modulation 4 (PAM4) method.

Referring to FIG. 4, the first voltage signal DPs may have one of a first logic level LV1, a second logic level LV2, a third logic level LV3, and a fourth logic level LV4. Also, the second voltage signal DNs may have one of the first logic level LV1, the second logic level LV2, the third logic level LV3, and the fourth logic level LV4. For example, the first logic level LV1 may be set to 300 mV, the second logic level LV2 may be set to 500 mV, the third logic level LV3 may be set to 700 mV, and the fourth logic level LV4 may be set to 900 mV.

For example, when bit data of the first encoded data edat1 is "1" and bit data of the second encoded data edat2 is "0", the transmission driver ABE may express a first pattern PT1 by setting the first voltage signal DPs to the fourth logic level LV4 and setting the second voltage signal DNs to the first logic level LV1.

For example, when the bit data of the first encoded data edat1 is "1" and the bit data of the second encoded data edat2 is "1", the transmission driver ABE may express a second pattern PT2 by setting the first voltage signal DPs to the third logic level LV3 and setting the second voltage signal DNs to the second logic level LV2.

For example, when the bit data of the first encoded data edat1 is "0" and the bit data of the second encoded data edat2 is "1", the transmission driver ABE may express a third pattern PT3 by setting the first voltage signal DPs to the second logic level LV2 and setting the second voltage signal DNs to the third logic level LV3.

For example, when the bit data of the first encoded data edat1 is "0" and the bit data of the second encoded data edat2 is "0", the transmission driver ABE may express a fourth pattern PT4 by setting the first voltage signal DPs to the first logic level LV1 and setting the second voltage signal DNs to the fourth logic level LV4.

The receiver RXDa may include an analog front-end AFE, a first decoder DEC1, a second decoder DEC2, and a receiving controller RXC.

The analog front end AFE may receive the first voltage signal DPs and the second voltage signal DNs, and generate first received data edat1' and second received data edat2' corresponding to a combination of the first voltage signal DPs and the second voltage signal DNs.

For example, the analog front end AFE may generate the first received data edat1' and the second received data edat2' by using a difference between the first voltage signal DPs and the second voltage signal DNs. Referring to FIG. 5, when the difference (for example, 600 mV) between the first voltage signal DPs and the second voltage signal DNs is greater than a third threshold value (+2 threshold), the analog front end AFE may determine that the first pattern PT1 has been received. In addition, when the difference (for example, 200 mV) between the first voltage signal DPs and the second voltage signal DNs is between a second threshold value (0 threshold) and the third threshold value (+2 threshold), the analog front end AFE may determine that the second pattern PT2 has been received. In addition, when the difference (for example, −200 mV) between the first voltage signal DPs and the second voltage signal DNs is between a first threshold value (−2 threshold) and the second threshold value (0 threshold), the analog front end AFE may determine that the third pattern PT3 has been received. In addition, when the difference (for example, −600 mV) between the first voltage signal DPs and the second voltage signal DNs is less than the first threshold value (−2 threshold), the analog front end AFE may be determined that the fourth pattern PT4 has been received.

The analog front end AFE may provide first received data edat1' and second received data eadt2' of different combinations corresponding to the patterns PT1, PT2, PT3 and PT4 to the first decoder DEC1 and the second decoder DEC2, respectively. For example, the first received data edat1' may include the same packets as the first encoded data edat1 and the second received data edat2' may include the same packets as the second encoded data edat2. For example, the analog front end AFE may provide the first received data edat1' in which bit data is "1" and the second received data edat2' in which bit data is "0" when the received signals correspond to the first pattern PT1. In addition, the analog front end AFE may provide the first received data edat1' in which the bit data is "1" and the second received data edat2' in which the bit data is "1" when the received signals correspond to the second pattern PT2. In addition, the analog front end AFE may provide the first received data edat1' in which the bit data is "0" and the second received data edat2' in which the bit data is "1" when the received signals correspond to the third pattern PT3. In addition, the analog front end AFE may provide the first received data edat1' in which the bit data is "0" and the second received data edat2' in which the bit data is "0" when the received signals correspond to the fourth pattern PT4.

The first decoder DEC1 may generate first decoded data odat1' by using the first received data edat1'. The first decoded data odat1' may include the same packets as the first data odat1.

Referring to FIG. 6, the first decoder DEC1 may decode the first conversion packets TGDP1$p$, TGDP2$p$, TGDP3$p$, . . . , and TGDP31$p$ into first data packets odat1' by using the first catalyst packet TCD1 among the first received data edat1'. For example, the first decoder DEC1 may generate the first data packets ADP1$p$, ADP2$p$, ADP3$p$, . . . , and ADP31$p$ by performing an XOR operation on the first catalyst packet TCD1 and the first conversion packets TGDP1$p$ to TGDP31$p$. For example, the first decoder DEC1 may generate the first data packet ADP1$p$ by performing an XOR operation on corresponding bits of the first conversion packet TGDP1$p$ and the first catalyst packet TCD1. For example, if the first conversion packet TGDP1$p$ is "011010" and the first catalyst packet TCD1 is "001101", the first data packet ADP1$p$ may be set to "010111".

The second decoder DEC2 may generate second decoded data odat2' by using the second received data edat2'. The second decoded data odat2' may include the same packets as the second data odat2.

The second decoder DEC2 may decode the second conversion packets TGDP32$n$ to TGDP62$n$ into second data packets by using the second catalyst packet TCD2 among the second received data edat2' (refer to FIG. 3). For example, the second decoder DEC2 may generate the second data packets by performing an XOR operation on the second catalyst packet TCD2 and the second conversion packets TGDP32$n$ to TGDP62$n$. Since the operation of the second decoder DEC2 may be substantially the same as that of the first decoder DEC1, duplicate descriptions thereof will be omitted.

The receiving controller RXC may receive the first decoded data odat1' from the first decoder DEC1 and receive the second decoded data odat2' from the second decoder DEC2. The receiving controller RXC may be a dedicated controller provided independently in the receiver RXDa, or may be a part of a general-purpose controller provided in an apparatus in which the receiver RXDa is used.

The receiving controller RXC may receive the first decoded data odat1' and the second decoded data odat2' in parallel at the same speed. That is, the first decoded data odat1' and the second decoded data odat2' may have the same UI (Unit Interval) and may be simultaneously received by the receiving controller RXC. For example, the receiving controller RXC may configure the received first decoded data odat1' as odd-numbered bits and configure the received second decoded data odat2' as even-numbered bits. For example, if the first decoder DEC1 sequentially provides "1110" as the first decoded data odat1' and the second decoder DEC2 sequentially provides "0011" as the second decoded data odat2', the receiving controller RXC may generate data of "10101101". Accordingly, the receiving controller RXC may restore data identical to the data transmitted from the transmission controller TXC.

Figure 7:
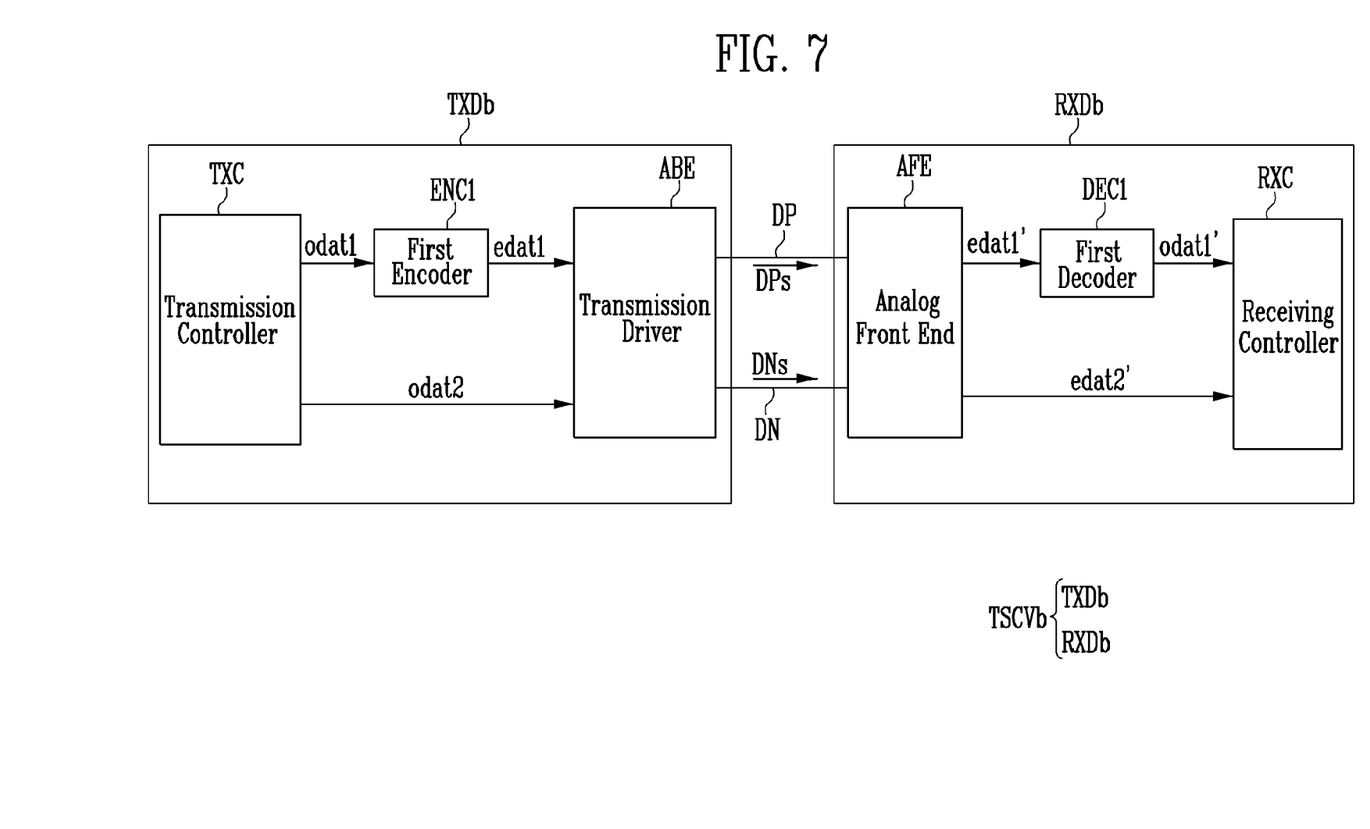
FIG. 7 is a diagram for explaining a transceiver according to another embodiment of the present inventive concept.

FIG. 7 is a diagram for explaining a transceiver according to another embodiment of the present inventive concept.

A transceiver TSCVb according to an embodiment of FIG. 7 may include a transmitter TXDb and a receiver RXDb. The transmitter TXDb may be different from the transmitter TXDa of FIG. 1 in that it includes only the first encoder ENC1 and does not include the second encoder ENC2. Also, the receiver RXDb may be different from the receiver RXDa of FIG. 1 in that it includes only the first decoder DEC1 and does not include the second decoder DEC2.

In the present embodiment, all packets of the first encoded data edat1 may be different from packets of the first data odat1. That is, the first encoded data edat1 may include catalyst packets and conversion packets, but may not include data packets. For example, the first encoded data edat1 may sequentially include a first catalyst packet and first conversion packets corresponding to the first catalyst packet, and may include a second catalyst packet immediately after the last first conversion packet. Also, the first encoded data edat1 may include second conversion packets corresponding to the second catalyst packet immediately after the second catalyst packet. A configuration of the first received data edat1' may be the same as that of the first encoded data edat1. A configuration of the first decoded data odat1' may be the same as that of the first data odat1.

The transmission controller TXC may provide the second data odat2 to the transmission driver ABE without encoding. The analog front end AFE may provide the second received data edat2' to the receiving controller RXC without decoding.

According to the embodiment of FIG. 7, the transceiver TSCVb may exclude the second encoder ENC2 and the second decoder DEC2 while maintaining the same data transmission rate (that is, the number of overhead packets is the same) as that of the transceiver TSCVa. Therefore, there is an advantage in terms of configuration cost. However, the first encoded data edat1 and the first received data edat1' may further include catalyst packets for each of the second data odat2 and the second received data edat2'. Therefore, the transmission controller TXC or the receiving controller RXC may further require additional logic to match the timing of the packets.

Figure 8:
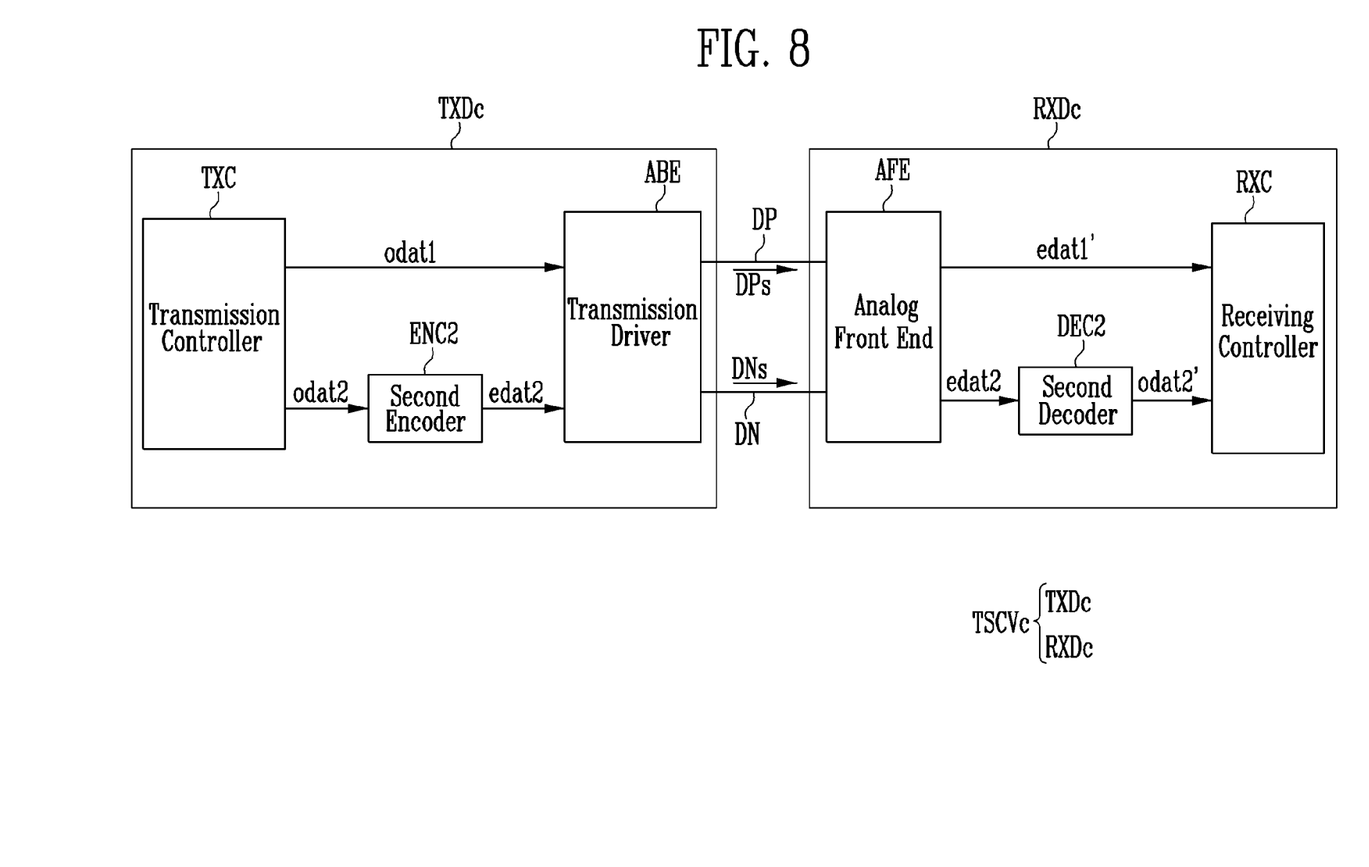
FIG. 8 is a diagram for explaining a transceiver according to still another embodiment of the present inventive concept.

FIG. 8 is a diagram for explaining a transceiver according to still another embodiment of the present inventive concept.

A transceiver TSCVc according to an embodiment of FIG. 8 may include a transmitter TXDc and a receiver RXDc. The transmitter TXDc may be different from the transmitter TXDa of FIG. 1 in that it includes only the second encoder ENC2 and does not include the first encoder ENC1. Also, the receiver RXDc may be different from the receiver RXDa of FIG. 1 in that it includes only the second decoder DEC2 and does not include the first decoder DEC1. Since the operation, advantage, and disadvantage of the transceiver TSCVc of FIG. 8 may be substantially the same as those of the transceiver TSCVb of FIG. 7, duplicate descriptions thereof will be omitted.

Figure 9:
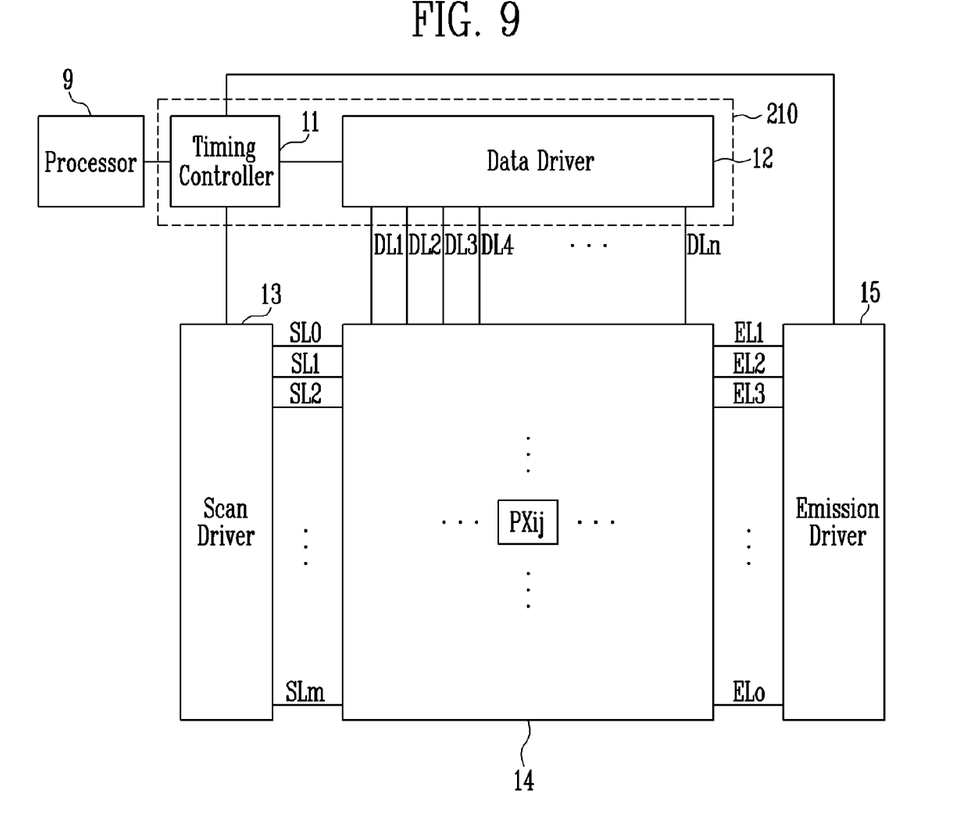
FIG. 9 is a diagram for explaining a display device according to an embodiment of the present inventive concept.

FIG. 9 is a diagram for explaining a display device according to an embodiment of the present inventive concept.

Referring to FIG. 9, a display device may include a timing controller 11, a data driver 12, a scan driver 13, a pixel unit 14, and an emission driver 15. However, the timing controller 11, the data driver 12, the scan driver 13, and the emission driver 15 may be integrated into one IC, be integrated into a plurality of ICs, or be mounted on a display substrate. The configuration of the timing controller 11, the data driver 12, the scan driver 13, and the emission driver 15 may be variously determined according to the specifications of the display device. The timing controller 11 and the data driver 12 may be integrated into one IC to constitute one display driver 210. In this case, the display driver 210 may be referred to as a TED (TCON Embedded Driver IC).

Depending on the type, the display driver 210 may further include at least one of the scan driver 13 and the emission driver 15.

A processor 9 may correspond to at least one of a graphics processing unit (GPU), a central processing unit (CPU), and an application processor (AP). The processor 9 may correspond to the above-described transmitter TXDa. Meanwhile, the timing controller 11, the data driver 12, or the display driver 210 may correspond to the above-described receiver RXDa (refer to FIG. 1).

The timing controller 11 may receive grayscales and timing signals for each display frame period from the processor 9. The timing signals may include a vertical synchronization signal, a horizontal synchronization signal, a data enable signal, and the like.

Each cycle of the vertical synchronization signal may correspond to each display frame period. Each cycle of the horizontal synchronization signal may correspond to each horizontal period. The grayscales may be supplied in units of horizontal lines in each horizontal period in response to a pulse of the data enable signal. A horizontal line may mean pixels (for example, a pixel row) connected to the same scan line and emission line.

The timing controller 11 may render the grayscales to correspond to the specifications of the display device. For example, the processor 9 may provide a red grayscale, a green grayscale, and a blue grayscale for each unit dot. For example, when the pixel unit 14 has an RGB stripe structure, each of the pixels may correspond to each grayscale one-to-one. In this case, it may not be necessary to render the grayscales. However, for example, when the pixel unit 14 has a pentile (PENTILE™) structure, since adjacent unit dots share a pixel, the pixels may not correspond to each grayscale one-to-one. In this case, it may be necessary to render the grayscales. The rendered or non-rendered grayscales may be provided to the data driver 12. In addition, the timing controller 11 may provide a data control signal to the data driver 12. Also, the timing controller 11 may provide a scan control signal to the scan driver 13 and provide an emission control signal to the emission driver 15.

The data driver 12 may generate data voltages (that is, data signals) to be provided to data lines DL1, DL2, DL3, DL4, . . . , and DLn using the grayscales and the data control signal received from the timing controller 11, where n may be an integer greater than zero.

The scan driver 13 may generate scan signals to be provided to scan lines SL0, SL1, SL2, . . . , and SLm using the scan control signal (for example, a clock signal, a scan start signal, and the like) received from the timing controller 11, where m may be an integer greater than 0. The scan driver 13 may sequentially supply the scan signals having a turn-on level pulse to the scan lines SL0 to SLm. The scan driver 13 may include scan stages including shift registers. The scan driver 13 may generate the scan signals by sequentially transferring the scan start signal in the form of a turn-on level pulse to the next scan stage according to the control of the clock signal.

The emission driver 15 may generate emission signals to be provided to emission lines EL1, EL2, EL3, . . . , and ELo using the emission control signal (for example, a clock signal, an emission stop signal, and the like) received from the timing control unit 11. The emission driver 15 may sequentially supply the emission signals having a turn-off level pulse to the emission lines EL1 to ELo, where o may be an integer greater than 0. The emission driver 15 may include emission stages including shift registers. The emission driver 15 may generate the emission signals by sequentially transmitting the emission stop signal in the form of a turn-off level pulse to the next emission stage according to the control of the clock signal.

The pixel unit 14 may include pixels. Each pixel PXij may be connected to a corresponding data line, a corresponding scan line, and a corresponding emission line. The pixels may include pixels emitting light of a first color, pixels emitting light of a second color, and pixels emitting light of a third color. The first color, the second color, and the third color may be different colors. For example, the first color may be one color of red, green, and blue, the second color may be one color other than the first color among red, green, and blue, and the third color may be one color other than the first color and the second color among red, green, and blue. In addition, magenta, cyan, and yellow may be used as the first to third colors instead of red, green, and blue.

Figure 10:
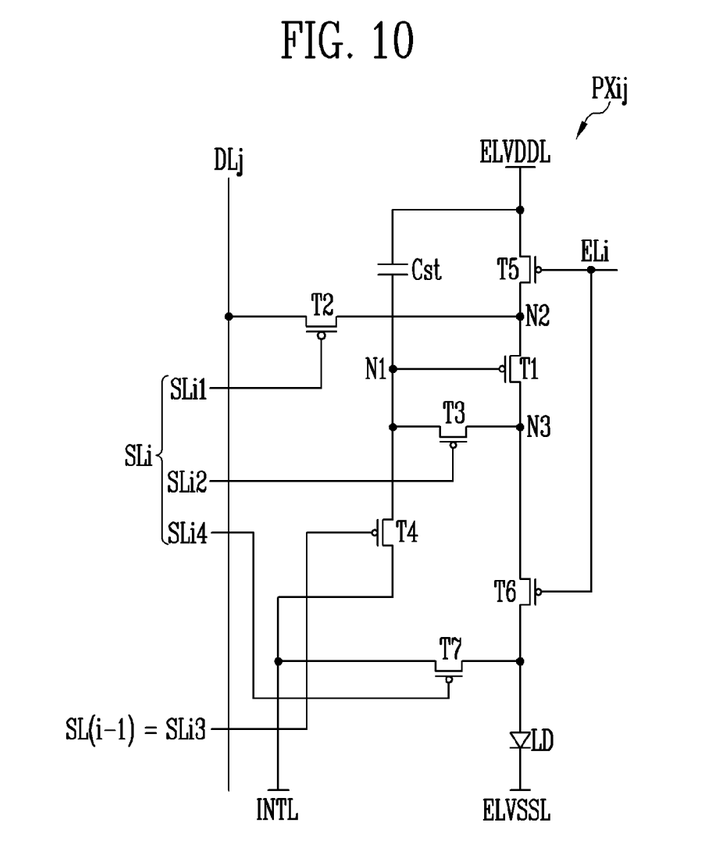
FIG. 10 is a diagram for explaining a pixel according to an embodiment of the present inventive concept.

FIG. 10 is a diagram for explaining a pixel according to an embodiment of the present inventive concept.

Referring to FIG. 10, the pixel PXij may include transistors T1, T2, T3, T4, T5, T6, and T7, a storage capacitor Cst, and a light emitting element LD.

Hereinafter, a circuit including P-type transistors will be described as an example. However, a person skilled in the art will be able to design a circuit including N-type transistors by changing the polarity of a voltage applied to a gate terminal. Similarly, a person skilled in the art would be able to design a circuit including a combination of P-type transistors and N-type transistors. A P-type transistor may generally refer to a transistor in which the amount of current increases when a voltage difference between a gate electrode and a source electrode increases in a negative direction. An N-type transistor may generally refer to a transistor in which the amount of current increases when a voltage difference between a gate electrode and a source electrode increases in a positive direction. The transistors may have various forms, such as a thin film transistor (TFT), a field effect transistor (FET), and a bipolar junction transistor (BJT).

A first transistor T1 may have a gate electrode connected to a first node N1, a first electrode connected to a second node N2, and a second electrode connected to a third node N3. The first transistor T1 may be referred to as a driving transistor.

A second transistor T2 may have a gate electrode connected to a scan line SLi1, a first electrode connected to a data line DLj, and a second electrode connected to the second node N2. The second transistor T2 may be referred to as a scan transistor.

A third transistor T3 may have a gate electrode connected to a scan line SLi2, a first electrode connected to the first node N1, and a second electrode connected to the third node N3. The third transistor T3 may be referred to as a diode-connected transistor.

A fourth transistor T4 may have a gate electrode connected to a scan line SLi3, a first electrode connected to the first node N1, and a second electrode connected to an initialization line INTL. The fourth transistor T4 may be referred to as a gate initialization transistor.

A fifth transistor T5 may have a gate electrode connected to an i-th emission line ELi, a first electrode connected to a first power source line ELVDDL, and a second electrode connected to the second node N2. The fifth transistor T5 may be referred to as an emission transistor. In another embodiment, the gate electrode of the fifth transistor T5 may be connected to an emission line different from an emission line connected to a gate electrode of a sixth transistor T6.

The sixth transistor T6 may have the gate electrode connected to the i-th emission line ELi, a first electrode connected to the third node N3, and a second electrode connected to an anode of the light emitting element LD. The sixth transistor T6 may be referred to as an emission transistor. In another embodiment, the gate electrode of the sixth transistor T6 may be connected to an emission line different from the emission line connected to the gate electrode of the fifth transistor T5.

A seventh transistor T7 may have a gate electrode connected to a scan line SLi4, a first electrode connected to the initialization line INTL, and a second electrode connected to the anode of the light emitting element LD. The seventh transistor T7 may be referred to as a light emitting element initialization transistor.

A first electrode of the storage capacitor Cst may be connected to the first power source line ELVDDL and a second electrode of the storage capacitor Cst may be connected to the first node N1.

The light emitting element LD may have the anode connected to the second electrode of the sixth transistor T6 and a cathode connected to a second power source line ELVSSL. The light emitting element LD may be a light emitting diode. The light emitting element LD may include an organic light emitting diode, an inorganic light emitting diode, a quantum dot/well light emitting diode, or the like. The light emitting element LD may emit light of any one of the first color, the second color, and the third color. In addition, although only one light emitting element LD is provided in each pixel in this embodiment, a plurality of light emitting elements may be provided in each pixel in another embodiment. In this case, the plurality of light emitting elements may be connected in series, in parallel, or in series and parallel.

A first power source voltage may be applied to the first power source line ELVDDL, a second power source voltage may be applied to the second power source line ELVSSL, and an initialization voltage may be applied to the initialization line INTL. For example, the first power source voltage may be greater than the second power source voltage. For example, the initialization voltage may be equal to or greater than the second power source voltage. For example, the initialization voltage may correspond to a data voltage having the smallest magnitude among data voltages that may be provided. In another example, the magnitude of the initialization voltage may be smaller than the magnitudes of the data voltages that may be provided.

Figure 11:
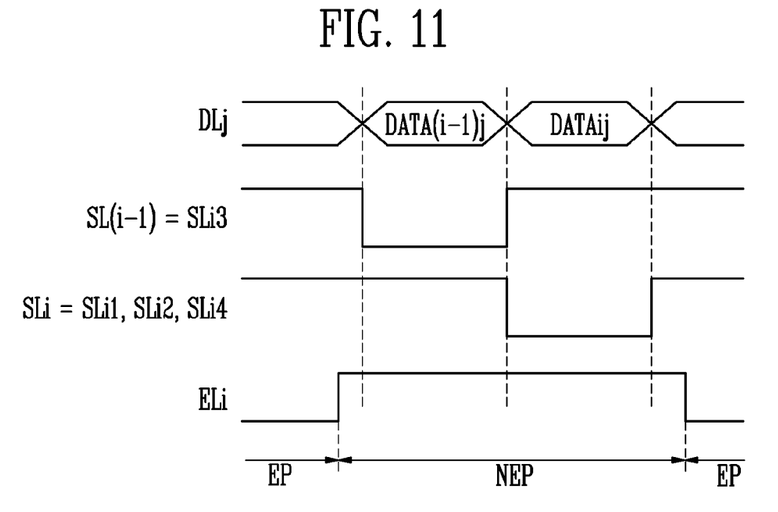
FIG. 11 is a diagram for explaining a method of driving the pixel of FIG. 10.

FIG. 11 is a diagram for explaining a method of driving the pixel of FIG. 10.

Hereinafter, for convenience of description, it is assumed that the scan lines SLi1, SLi2, and SLi4 are an i-th scan line SLi, and the scan line SLi3 is an (i−1)th scan line SL(i−1). However, the connection relationship of the scan lines SLi1, SLi2, SLi3, and SLi4 may vary according to embodiments. For example, the scan line SLi4 may be the (i−1)th scan line or an (i+1)th scan line.

First, an emission signal of a turn-off level (logic high level) may be applied to the i-th emission line ELi, a data voltage DATA(i−1)j for an (i−1)th pixel may be applied to the data line DLj, and a scan signal of a turn-on level (logic low level) may be applied to the scan line SLi3. High and low at the logic level may vary depending on whether the transistor is P-type or N-type.

In this case, since a scan signal of a turn-off level is applied to the scan lines SLi1 and SLi2, the second transistor T2 may be turned off, and the data voltage DATA(i−1)j for the (i−1)th pixel may be prevented from being applied to the pixel PXij.

In this case, since the fourth transistor T4 is turned on, the first node N1 may be connected to the initialization line INTL, and a voltage of the first node N1 may be initialized. Since the emission signal of the turn-off level is applied to the emission line ELi, the transistors T5 and T6 may be turned off, and unnecessary light emitting of the light emitting element LD according to the application of the initialization voltage may be prevented.

Next, a data voltage DATAij for an i-th pixel PXij may be applied to the data line DLj, and a scan signal of a turn-on level may be applied to the scan lines SLi1 and SLi2. Accordingly, the transistors T2, T1, and T3 may be turned on, and the data line DLj and the first node N1 may be electrically connected to each other. Accordingly, a compensation voltage obtained by subtracting a threshold voltage of the first transistor T1 from the data voltage DATAij may be applied to the second electrode (that is, the first node N1) of the storage capacitor Cst, and the storage capacitor Cst may maintain a voltage corresponding to a difference between the first power source voltage and the compensation voltage. This period may be referred to as a threshold voltage compensation period or a data writing period.

In addition, when the scan line SLi4 is the i-th scan line, since the seventh transistor T7 is turned on, the anode of the light emitting element LD and the initialization line INTL may be connected to each other, and the light emitting element LD may be initialized with the amount of charge corresponding to a voltage difference between the initialization voltage and the second power source voltage.

Thereafter, as an emission signal of a turn-on level is applied to the i-th emission line ELi, the transistors T5 and T6 may be turned on. Accordingly, a driving current path connecting the first power source line ELVDDL, the fifth transistor T5, the first transistor T1, the sixth transistor T6, the light emitting element LD, and the second power source line ELVSSL may be formed.

The amount of a driving current flowing through the first electrode and the second electrode of the first transistor T1 may be adjusted according to the voltages in the storage capacitor Cst. The light emitting element LD may emit light with a luminance corresponding to the amount of the driving current. The light emitting element LD may emit light until an emission signal of a turn-off level is applied to the emission line ELi.

When the emission signal is at the turn-on level, pixels receiving the corresponding emission signal may be in a display state. Accordingly, a period in which the emission signal is at the turn-on level may be referred to as an emission period EP (or an emission allowable period). Also, when the emission signal is at the turn-off level, pixels receiving the corresponding emission signal may be in a non-display state. Accordingly, a period in which the emission signal is at the turn-off level may be referred to as a non-emission period NEP (or an emission disallowing period).

The non-emission period NEP described in FIG. 11 may be a period for preventing the pixel PXij from emitting light with an undesired luminance during the initialization period and the data writing period.

One or more non-emission periods NEP may be additionally provided while data written in the pixel PXij is maintained (for example, one frame period). This may be to effectively express a low grayscale or to smoothly blur the motion of an image by reducing the emission period EP of the pixel PXij.

The display device, the pixel, and the method of driving the pixel of FIGS. 9 to 11 are for explaining an example to which one of the above-described transceivers TSCVa, TSCVb, and TSCVc is applied, but the present inventive concept is not limited to these embodiment. For example, the transceivers TSCVa, TSCVb, and TSCVc may be used for communication between the processor 9 included in the display device and a camera device, or may be used for communication between the processor 9 and a touch sensor (or other sensors).

The transceiver and the driving method thereof according to the present inventive concept can minimize overhead packets while maintaining frequent transitions of transmitted data.

The drawings referred to heretofore and the detailed description of the inventive concept described above are merely illustrative of the inventive concept. It is to be understood that the inventive concept has been disclosed for illustrative purposes only and is not intended to limit the meaning or scope of the inventive concept as set forth in the claims. Therefore, those skilled in the art will appreciate that various modifications and equivalent embodiments are possible without departing from the scope of the inventive concept. Accordingly, the true technical protection scope of the inventive concept should be determined by the technical idea of the appended claims.

What is claimed is:

1. A transceiver comprising:
   a transmitter and a receiver connected by a first line and a second line,
   wherein the transmitter includes:
   a first encoder generating first encoded data by using first data;
   a second encoder generating second encoded data by using second data; and
   a transmission driver generating a first voltage signal and a second voltage signal corresponding to a combination of the first encoded data and the second encoded data, applying the first voltage signal and the second voltage signal to the receiver through the first line and the second line, respectively,
   wherein the first encoder generates the first encoded data different from the first data during a first period and the second encoder generates the second encoded data equal to the second data during the first period,
   wherein the second encoder generates the second encoded data different from the second data during a second period and the first encoder generates the first encoded data equal to the first data during the second period, and
   wherein the first period and the second period are arranged to alternate with each other.

2. The transceiver of claim 1, wherein the first period includes a first-first period and a second-first period, and the second period includes a first-second period arranged between the first-first period and the second-first period, and
   wherein an interval between an end time point of the first-first period and a start time point of the first-second period is greater than an interval between an end time point of the first-second period and a start time point of the second-first period following the first-second period.

3. The transceiver of claim 2, wherein the interval between the end time point of the first-first period and the start time point of the first-second period is equal to a transmission time of one unit packet.

4. The transceiver of claim 3, wherein a number of unit packets constituting the first period is $(2^{(n-1)})-1$ when a number of bits constituting the one unit packet is n, where n is a positive integer greater than or equal to 2.

5. The transceiver of claim 4, wherein a length of the first period and a length of the second period are the same.

6. The transceiver of claim 1, wherein the first encoder generates a first catalyst packet different from first data packets of the first data, encodes the first data packets into first conversion packets using the first catalyst packet, and outputs the first catalyst packet and the first conversion packets as the first encoded data during the first period.

7. The transceiver of claim 6, wherein the first encoder generates the first conversion packets by performing an XOR (Exclusive OR) operation on the first catalyst packet and the first data packets.

8. The transceiver of claim 6, wherein the second encoder generates a second catalyst packet different from second data packets of the second data, encodes the second data packets into second conversion packets using the second catalyst packet, and outputs the second conversion packets as the second encoded data during the second period.

9. The transceiver of claim 8, wherein the second encoder outputs the second catalyst packet between the end time point of the first period and the start time point of the second period.

10. The transceiver of claim 1, wherein the receiver includes:
    an analog front end receiving the first voltage signal and the second voltage signal and generating first received data and second received data corresponding to a combination of the first voltage signal and the second voltage signal;
    a first decoder generating first decoded data by using the first received data; and
    a second decoder generating second decoded data by using the second received data.

11. The transceiver of claim 10, wherein the first received data include the same packets as the first encoded data,
    wherein the second received data include the same packets as the second encoded data,
    wherein the first decoded data include the same packets as the first data, and
    wherein the second decoded data include the same packets as the second data.

12. The transceiver of claim 11, wherein the first decoder decodes first conversion packets into first data packets by using a first catalyst packet among the first received data, and
    wherein the second decoder decodes second conversion packets into second data packets by using a second catalyst packet among the second received data.

13. The transceiver of claim 12, wherein the first decoder generates the first data packets by performing an XOR operation on the first catalyst packet and the first conversion packets, and
    wherein the second decoder generates the second data packets by performing an XOR operation on the second catalyst packet and the second conversion packets.

14. A driving method of a transceiver including a transmitter and a receiver connected by a first line and a second line, comprising:
    generating, by a first encoder of the transmitter, first encoded data using first data;
    generating, by a second encoder of the transmitter, second encoded data using second data; and
    generating, by a transmission driver of the transmitter, a first voltage signal and a second voltage signal corresponding to a combination of the first encoded data and the second encoded data, applying the first voltage signal and the second voltage signal to the receiver through the first line and the second line, respectively, wherein the first encoder generates the first encoded data different from the first data during a first period and the second encoder generates the second encoded data equal to the second data during the first period, wherein the second encoder generates the second encoded data different from the second data during a second period and the first encoder generates the first encoded data equal to the first data during the second period, and wherein the first period and the second period are arranged to alternate with each other.

15. The driving method of claim 14, wherein the first period includes a first-first period and a second-first period, and the second period includes a first-second period arranged between the first-first period and the second-first period, and wherein an interval between an end time point of the first-first period and a start time point of the first-second period is greater than an interval between an end time point of the first-second period and a start time point of the second-first period following the first-second period.

16. The driving method of claim 15, wherein the interval between the end time point of the first-first period and the start time point of the first-second period is equal to a transmission time of one unit packet.

17. The driving method of claim 16, wherein a number of unit packets constituting the first period is $(2^{(n-1)})-1$ when a number of bits constituting the one unit packet is n, where n is a positive integer greater than or equal to 2.

18. The driving method of claim 17, wherein a length of the first period and a length of the second period are the same.

19. The driving method of claim 14, wherein the first encoder generates a first catalyst packet different from first data packets of the first data, encodes the first data packets into first conversion packets using the first catalyst packet, and outputs the first catalyst packet and the first conversion packets as the first encoded data during the first period.

20. The driving method of claim 19, wherein the first encoder generates the first conversion packets by performing an XOR operation on the first catalyst packet and the first data packets.

* * * * *